United States Patent [19]

Degani et al.

[11] Patent Number: 5,796,900
[45] Date of Patent: Aug. 18, 1998

[54] APPARATUS AND METHODS FOR INTERCONNECTING ARRAYS OF OPTICAL TRANSMISSION PATHS EMPLOYING EXTERNALLY LOCATED CONNECTOR PADS

[75] Inventors: Yinon Degani; Herman Melvin Presby, both of Middlesex, N.J.

[73] Assignee: Lucent Technologies, Inc., Murray Hill, N.J.

[21] Appl. No.: 768,769

[22] Filed: Dec. 17, 1996

Related U.S. Application Data

[63] Continuation of Ser. No. 350,869, Dec. 7, 1994, abandoned.
[51] Int. Cl.[6] ............................................. G02B 6/255
[52] U.S. Cl. .......................................................... 385/95
[58] Field of Search ................................. 385/88, 94–95, 385/96–99, 135, 147

[56] References Cited

U.S. PATENT DOCUMENTS 4,772,086  9/1988  Bellerby et al. ............................ 385/31
4,787,696  11/1988  Norris et al. .............................. 385/88
5,163,108  11/1992  Armiento et al. ......................... 385/52

FOREIGN PATENT DOCUMENTS 0 388 642  9/1990  European Pat. Off. .

Primary Examiner—Akm E. Ullah

[57] ABSTRACT

A method of connecting arrays of optical wavepaths is described employing externally located connector pads. After optically aligning the arrays to be connected, the connector pads are bonded to the arrays and then to each other. In the preferred embodiments, the pads, which typically are thin silicon wafers, and the arrays are metalized and then soldered together. The use of connector pads to connect arrays of optical transmission paths results in sturdy, stable connections. The technique is fast, simple and inexpensive, and is consistent with current alignment procedures. By using solder to secure the pads to the arrays and to each other, connections can be undone and then redone. Inasmuch as all connections are external to the optical paths, there is no deterioration of the optical connections with time.

8 Claims, 6 Drawing Sheets

APPARATUS AND METHODS FOR INTERCONNECTING ARRAYS OF OPTICAL TRANSMISSION PATHS EMPLOYING EXTERNALLY LOCATED CONNECTOR PADS

This is a continuation of application Ser. No. 08/350,869, filed Dec. 7, 1994 now abandoned.

TECHNICAL FIELD

This invention relates to apparatus and methods for interconnecting arrays of optical transmission paths, including integrated optical circuits (IOCs) and optical fibers.

BACKGROUND OF THE INVENTION

Advances in the design and fabrication of integrated optical circuits have made such devices extremely attractive candidates for use in optical transmission systems. However, it has been recognized that if IOCs are to be incorporated into fiber communication systems, a practical and commercially viable system of coupling such circuits to glass fibers must be devised. At present, glass core waveguides of integrated optical devices made using doped silica deposited on a silicon substrate are normally butt-coupled to arrays of input and output optical fibers by means of a bonding material such as a UV or heat cured epoxy. The substance used to join the waveguides of the optical device to the abutting optical fibers may also serve the necessary function of filling in gaps which may exist at the butt-coupling. In a publication entitled "Fiber Attachment for Guided Wave Devices" by E. J. Murphy, *Journal of Lightwave Technology*, Vol. 6, No. 6, Jun. 1988, a review of the status of fiber attachments to guided-wave devices is presented. In this paper, contemporary methods for achieving low fiber-to-waveguide insertion losses are discussed, and techniques for aligning and permanently attaching fibers are described. The author also indicates that the use of an appropriate bonding material and method of application is critical, as it determines the stability and reliability of the fiber-to-waveguide joint. He further notes that while epoxies are widely used because they can be cured rapidly without compromising the fiber alignment, they are not reliable. They are of questionable stability when subjected to environmental extremes of temperature, pressure and humidity. Thus, in those applications where failure of the bonding material or deterioration of its optical properties can result in extremely expensive repairs, such as in undersea cables, the use of such materials is not acceptable.

In U.S. Pat. No. 5,208,885, issued May 4, 1993, and assigned to applicants' assignee, a more reliable fiber-waveguide butt-coupling is described in which a glass is used to fuse the fibers to the waveguides. The glass material, which melts at a temperature that is lower than the temperature to which the waveguide can be safely heated, is applied to either the optical fibers and/or the waveguides. The glass material is then heated, allowing the molten glass to connect the fibers to the waveguides. More recently, in U.S. Pat. No. 5,371,818 issued Dec. 6, 1994 and assigned to applicants' assignee, a method for directly fusing optical fibers to optical waveguides, without the use of additional molten glass, is described.

While these latter two methods of butt-coupling fibers to waveguides are much superior to those employing epoxies, the resulting joints require additional reinforcement and protection in order to make them robust to handling, and environmentally stable. Clearly, a method of joining such waveguiding structures that would directly yield a stable, robust connection would be preferred.

It is, accordingly, the broad object of the present invention to provide a method of producing robust and stable interconnections between arrays of optical wavepaths.

SUMMARY OF THE INVENTION

In accordance with the present invention, connector pads are used to secure the optical arrays to be coupled together. In one illustrative embodiment of the invention, a connector pad is secured to each of the arrays. The arrays are then actively aligned and the two pads secured to each other to produce a sturdy, stable mechanical connection.

By using connector pads in the manner described, everything associated with securing the two optical arrays to each other is located outside of the optical wavepaths. Hence, there is nothing that can deteriorate and adversely affect the quality of the optical interconnections.

The connector pads can be secured to the arrays and to each other using a suitable epoxy. In a preferred embodiment, the pads are soldered to the arrays and to each other.

As will be described in greater detail hereinbelow, various arrangements of the connector pads are possible. The precise configuration of pads will depend upon the physical configuration of the optical arrays and the needs of the optical circuits.

BRIEF DESCRIPTION OF THE INVENTION

DETAILED DESCRIPTION

Figure 1:
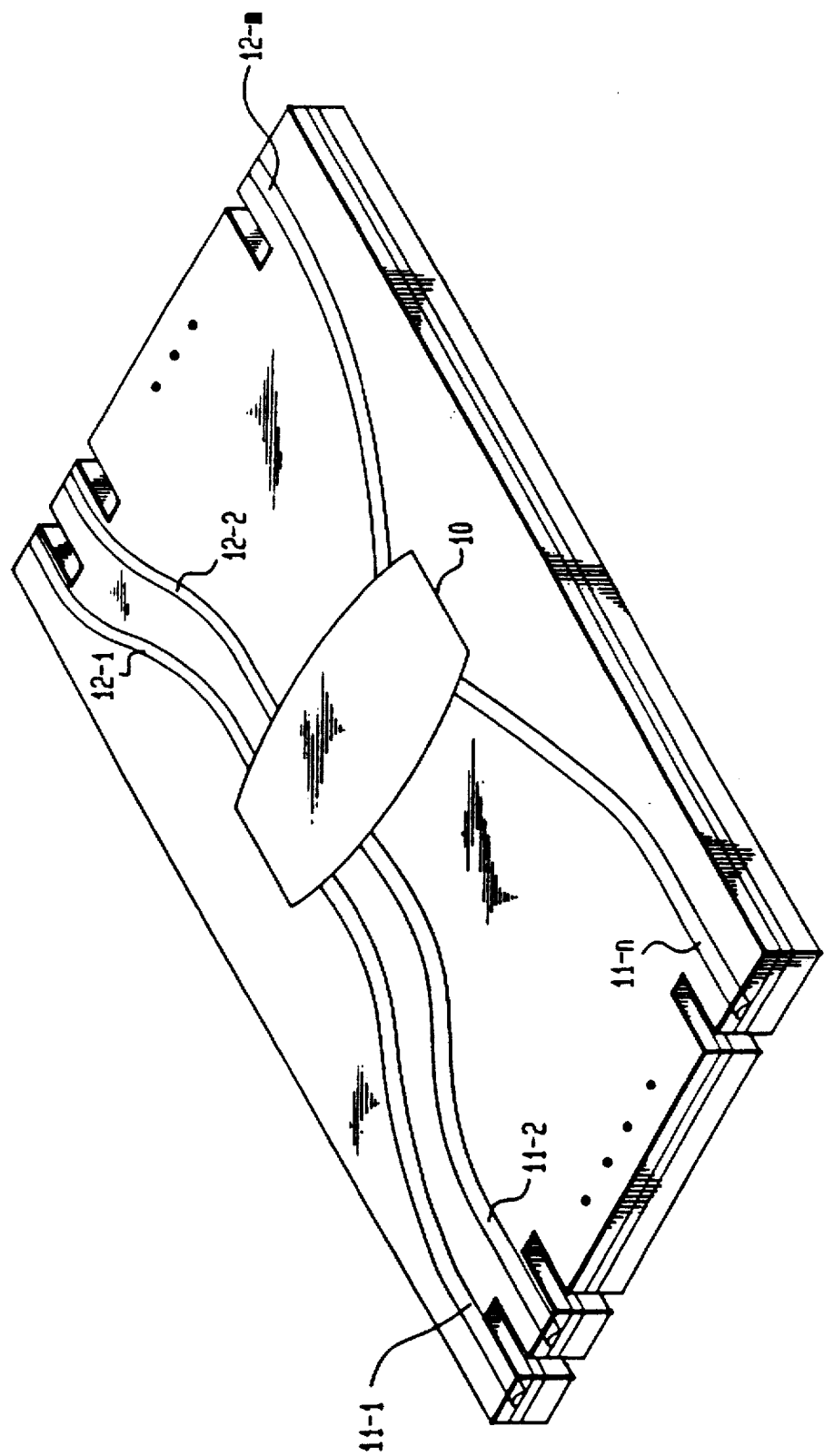
FIG. 1 shows a prior art integrated optical circuit to which the invention relates.

Referring to the drawings, FIG. 1 shows the general configuration of the class of integrated optical devices to which the invention relates. Typically, such devices are fabricated by depositing doped silica waveguides on a silicon substrate using standard silica/silicon (SiO$_2$/Si) technology, as described in an article entitled "Silica Waveguides On Silicon And Their Application to Integrated Optical Components," by M. Kawachi, published in *Optical and Quantum Electronics*, 22, 1990, 391–416. These devices can be configured to form a variety of useful optical circuits for use in communication and signal processing networks. Thus, in FIG. 1, the interaction region 10 is illustrated without detail.

Figure 2:
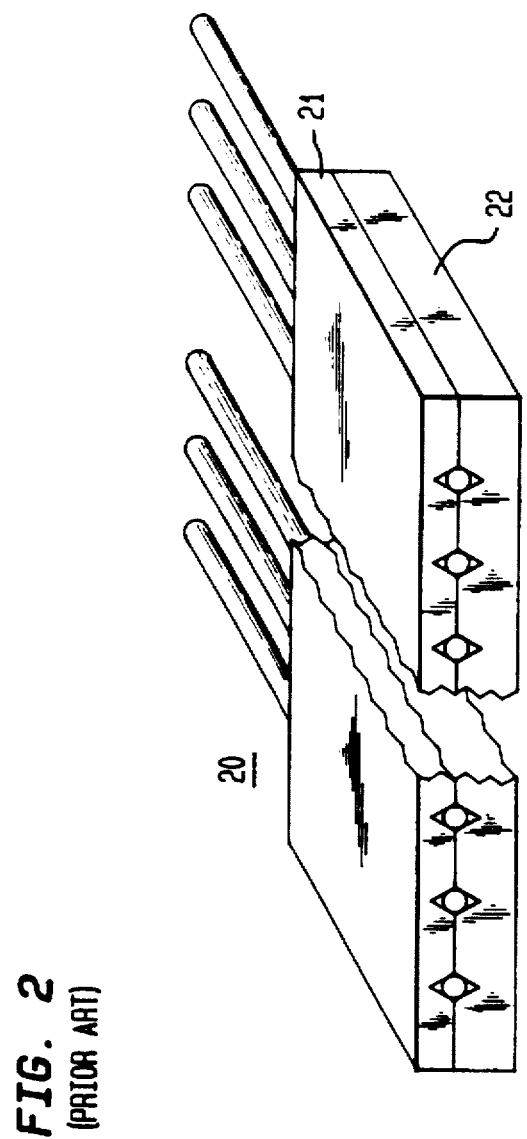
FIG. 2 shows prior art optical fiber pigtails.

Optical signals are coupled into and out of region 10 by means of one or more single-mode waveguides 11-1, 11-2, ... 11-n, and 12-1, 12-2 ... 12-m. However, in order to couple into and out of waveguide arrays 11 and 12, fiber pigtails are advantageously affixed to the device. The pigtails are short lengths of optical fibers 20 which are held between a pair of V-groove chips 21 and 22, as illustrated in FIG. 2. The fibers are spaced apart a distance equal to the space between the adjacent waveguides 11-1, 11-2 ... and 12-1, 12-2 ... which is usually 250 µm.

Figure 3:
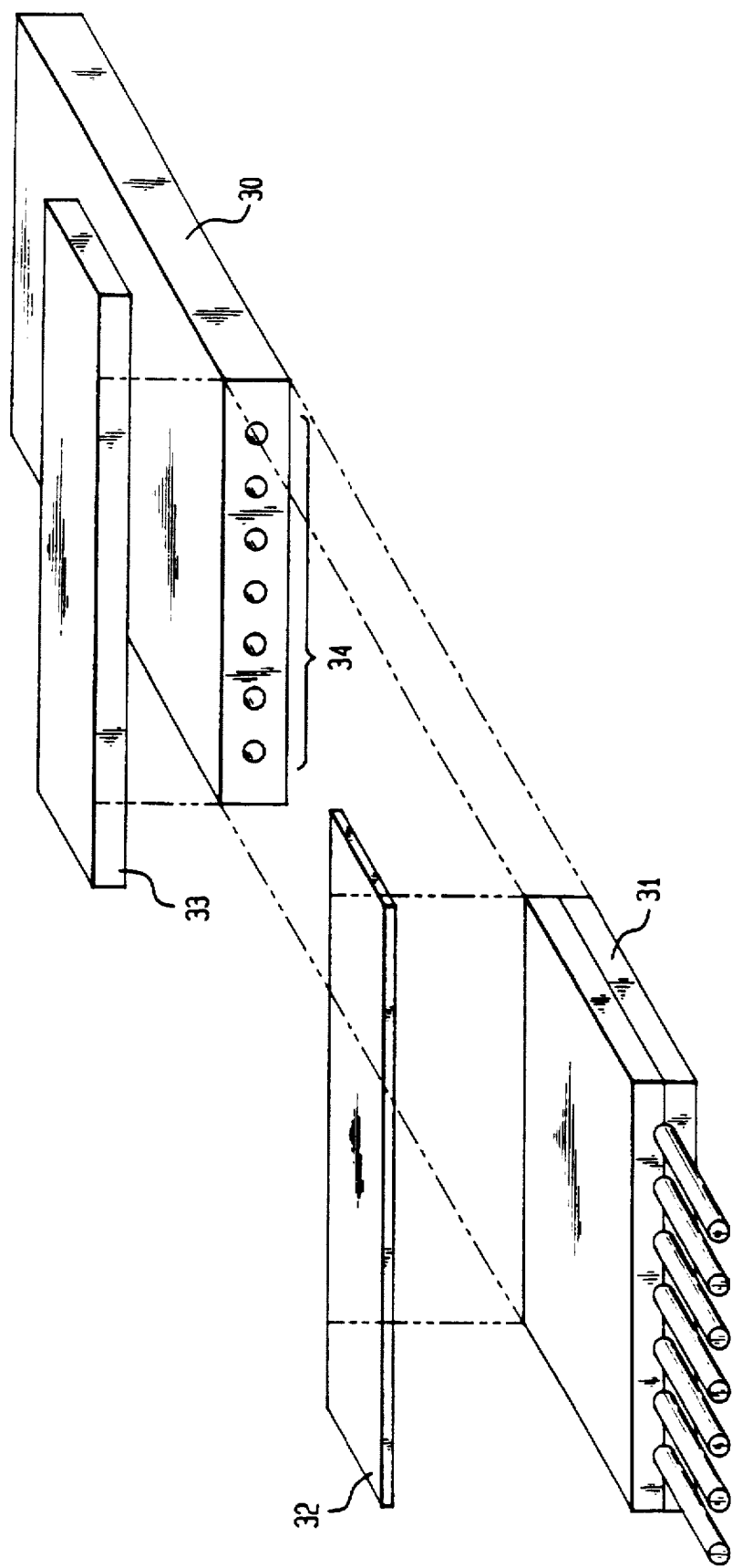
FIG. 3 is an exploded view of optical arrays prepared for joining in accordance with the present invention.
Figure 4:
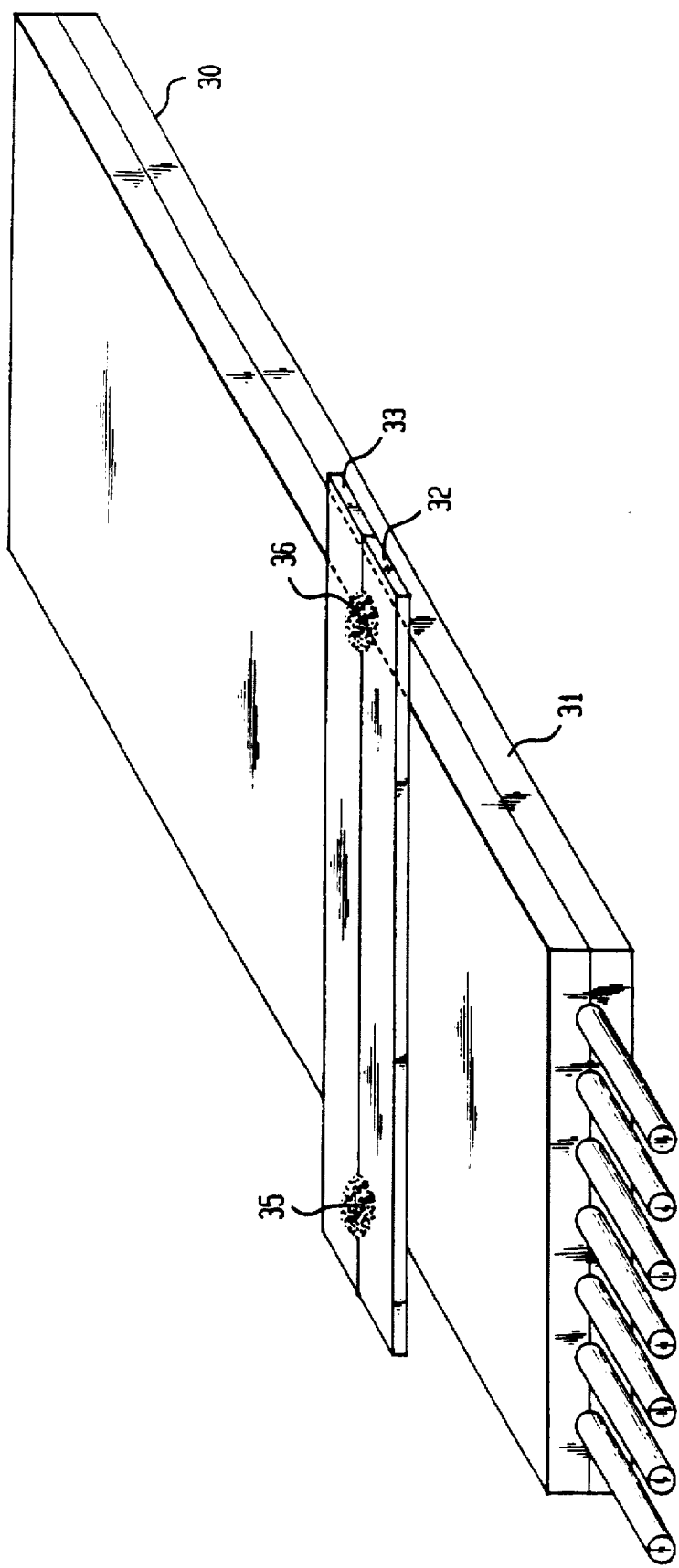
FIG. 4 shows the resulting connection of the arrays prepared as illustrated in FIG. 3.

To secure the pigtail array to the array of waveguides, in accordance with the present invention, connector pads are employed as illustrated in FIG. 3. The latter is an exploded view of optical arrays prepared for connection in accordance with the present invention including an integrated optical device 30, a fiber pigtail array 31, and two connector pads 32 and 33. To secure the fibers of array 31 to an array of waveguides 34 of device 30, one of the connector pads 32 is secured to the top of array 31, and the other connector pad 33 is secured to the top of device 30. The two arrays 31 and 34 are then actively aligned and the two pads 32 and 33 bonded to each other. The resulting structure is illustrated in FIG. 4. Using the same identification numerals in FIG. 4 as were used in FIG. 3, FIG. 4 shows the IOC 30 butt-joined to fiber pigtail 31, with the connector pads 32 and 33 secured, respectively to device 30 and fiber array 31, and to each other. The latter connections are indicated by the shaded areas 35 and 36.

As noted above, all mechanical bonds are made totally external to the optical wavepaths. As a consequence, none of the materials used to secure the respective components interferes with the optical paths. Thus, while the transmission properties of epoxies may deteriorate with time, they can be used in the instant case to secure the connector pads 32 and 33 to device 30, to the fiber array 31, and to each other. However, some epoxies must be applied at elevated temperatures. This would require raising the temperature of everything during the alignment process. Furthermore, there may be applications where the ability to undo a connection is important. Accordingly, in a preferred embodiment of the invention, the various connections are made using solder which only requires localized heating. Connectors made in this manner produce sturdy, stable connections that could easily be undone and reattached. In addition, optical alignment could be done at room temperature using standard alignment equipment and techniques.

Index matching gel can be used, if desired, to reduce reflections between the fibers and the circuits wavepaths.

Figure 5:
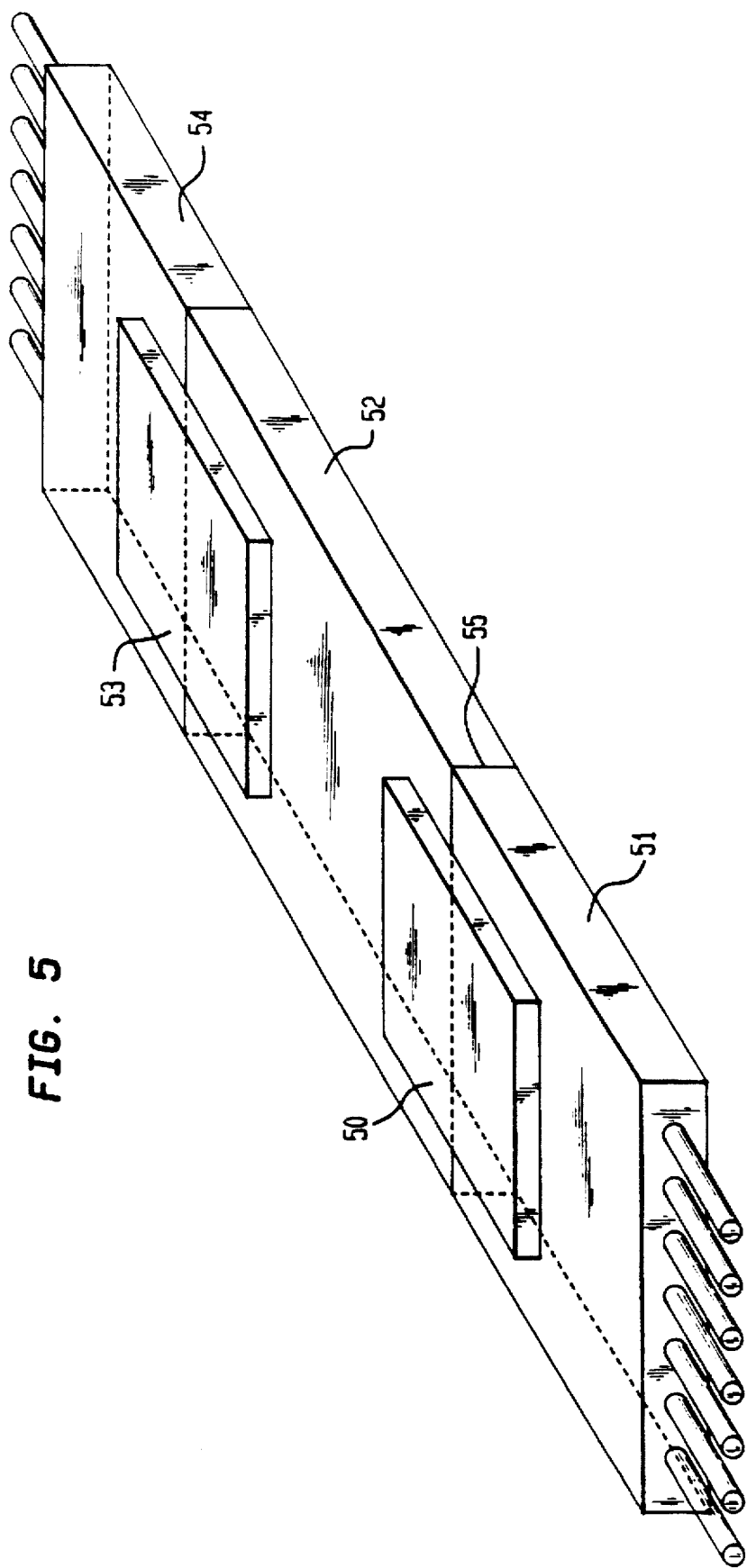
FIG. 5 illustrates a second embodiment of the invention employing a single connector pad.

FIG. 5 illustrates a second embodiment of the invention using one connector pad to butt-join two optical arrays. In this configuration, a single bridging connector pad 50 joins a fiber array to one end of an IOC 52. Similarly, a second single bridging connector pad 53 connects a second fiber array 54 to the other end of IOC 52.

Figure 6:
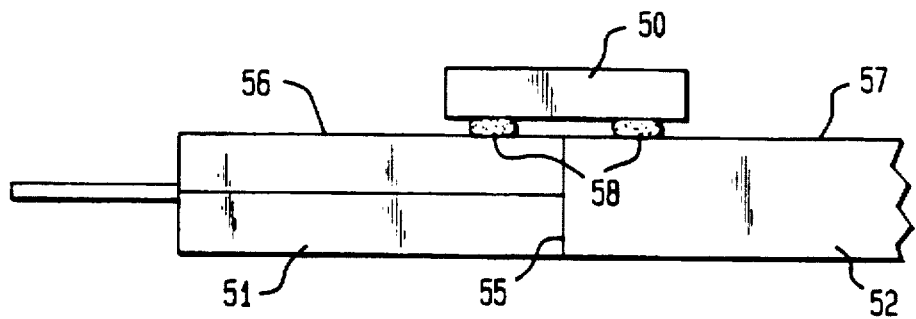
FIG. 6 shows an end view of the embodiment of FIG. 7.

FIG. 6 shows an end view of each of the connections. Using the same identification numerals as in FIG. 5, bridging pad 50 extends over the interface 55 of the two abutting arrays 51 and 52, and is bonded to the adjacent surfaces 56 and 57 of the respective arrays.

In order to match the thermal expansion of the arrays, which are typically silicon based, the connector pad is advantageously made of silicon. If the pad is to be soldered to the fiber arrays, the pad and the array chips are first metalized in order to accept the solder. This can be done using standard sputtering techniques. In this particular configuration, portions of the bottom surface of pad 50 and corresponding portions of the top surfaces 56 and 57 of the optical arrays are metalized. Solder 58 is then placed between the pad and the arrays. With the arrays held in optical alignment, heat is then locally applied to the solder. The solder is conveniently applied as a paste. The particular solder used by applicants contained 42% tin and 58% bismuth. However, this particular solder alloy is not critical and other alloys can just as readily be used.

Metalization of the silicon surfaces included laying down 500 to 1500 Å of titanium that acts as a "glue" layer; 1500 to 3000 Å of platinum that acts as a barrier; and 500 to 2000 Å of gold that serves to prevent oxidation of the barrier layer. Here again, the dimensions and materials used are not critical. Other dimensions and materials can be selected to obtain the desired metalization by those skilled in the art.

The thickness of the connector pads was approximately 25 mils. Heat was locally applied by means of a hot-air torch.

Improved transmission through the butt-joints can be achieved with the use of an index matching gel at the interface 55.

Figure 7:
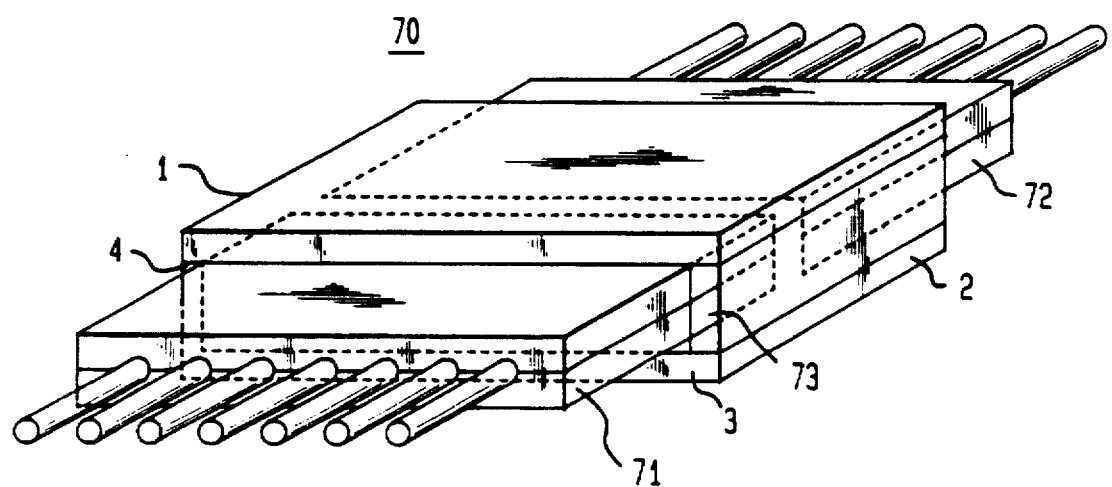
FIG. 7 illustrates the use of connector pads to form a hermetically sealed connection.

Connector pads can also be employed to make a water-tight connection, as illustrated in FIG. 7. In this embodiment pads 1, 2, 3 and 4 are connected together to form a rectangular enclosure 70 into which the two optical arrays 71 and 72 are placed. After optical alignment, the spaces between the enclosure 70 and the arrays 71 and 72 are sealed to form an hermetic connection. In a preferred embodiment, the interior edges of the enclosure and the adjacent surfaces are metalized, and a hermetic solder seal formed.

In summary, the use of connector pads to mechanically connect arrays of optical transmission paths results in sturdy, stable connections. The technique is fast, simple and inexpensive, and is consistent with current alignment procedures. By using solder to secure the pads to the arrays and to each other, connections can be undone and then redone. Inasmuch as all connections are external to the optical paths, there is no deterioration of the optical connections with time. Finally, by extending the pads beyond the array, as in FIG. 3, a mounting platform is conveniently provided.

What is claimed is:

1. A method of securely butt-joining the wavepaths in a first array of optical wavepaths to the respective wavepaths in a second array of optical wavepaths using a connector pad comprising the steps of:

first, placing an end of one of said arrays adjacent to an end of the second of said arrays and optically aligning the optical wavepaths in said respective arrays;

then placing a single connector pad so as to extend from a position along said first array to the opposite side of said butt-joint to a position along said second array;

and then bonding said single connector pad to both of said arrays.

2. A method according to claim 1 wherein said bonding is done by soldering.

3. A method of connecting a pair of arrays of optical wavepaths to each other using connector pads including the steps of:

bonding four connector pads to form a rectangular enclosure large enough to receive said optical arrays;

inserting said arrays into opposite ends of said enclosure;

optically aligning the optical wavepaths of said arrays;

and sealing any space between said enclosure and said arrays.

4. The method according to claim 3 wherein:

said space between said enclosure and said arrays is sealed with solder.

5. The method according to claim 3 wherein said sealing forms an hermetic seal.

6. The method according to claim 1 wherein:

said connector pad is made of silicon.

7. A product made in accordance with the method of claim 1.

8. A product made in accordance with the method of claim 3.

* * * * *